United States Patent
Lequis et al.

[11] Patent Number: 5,609,072
[45] Date of Patent: Mar. 11, 1997

[54] CHANGE-SPEED GEARBOX FOR MOTOR VEHICLES WITH A FRONT MOUNTED TRANSVERSE DRIVE UNIT

[75] Inventors: Rolf Lequis, Hennef; Gerd Adams, Leichlingen; Hartmut Deidewig, Roesrath, all of Germany

[73] Assignee: Ford Motor Company, Dearborn, Mich.

[21] Appl. No.: 528,269

[22] Filed: Sep. 14, 1995

[30] Foreign Application Priority Data

Nov. 15, 1994 [DE] Germany ............ 44 40 742.4

[51] Int. Cl.$^6$ ................................. F16H 57/02
[52] U.S. Cl. ................ 74/606 R; 74/331; 74/420
[58] Field of Search ................. 74/606 R, 225, 74/329, 331, 420, 423

[56] References Cited

U.S. PATENT DOCUMENTS

| | | | |
|---|---|---|---|
| 4,463,823 | 8/1984 | Tsuboi | 74/606 R X |
| 4,738,152 | 4/1988 | Takimura et al. | 74/606 R X |
| 4,793,202 | 12/1988 | Okubo | 74/606 R X |
| 5,050,447 | 9/1991 | Hayakawa et al. | 74/606 R |
| 5,105,686 | 4/1992 | Onuma et al. | 74/606 R |
| 5,297,447 | 3/1994 | Massaccesi | 74/606 R X |
| 5,345,839 | 9/1994 | Nett et al. | 74/606 R |
| 5,375,482 | 12/1994 | Dangel | 74/606 R |
| 5,415,598 | 5/1995 | Sawase et al. | 74/606 R X |
| 5,509,329 | 4/1996 | Jackson et al. | 74/606 R |

FOREIGN PATENT DOCUMENTS

3621620C2  1/1988  Germany.

Primary Examiner—Charles A. Marmor
Assistant Examiner—Peter T. Kwon
Attorney, Agent, or Firm—Frank G. McKenzie

[57] ABSTRACT

In a change-speed gearbox or motor vehicles with a front molted transverse drive unit comprising a change-speed gearbox in line with an engine and a final drive (10) which is driven by the output gearwheel (9) of the change-speed gearbox and has its main axle mounted in the gearbox housings 1, 2, the final drive (10) is a bevel gear right-angle drive consisting of a crown wheel (11) and a pinion (12) and the crown wheel (11) is arranged on an axle member (13) consisting of the same material as the gearbox housings.

3 Claims, 2 Drawing Sheets

5,609,072

CHANGE-SPEED GEARBOX FOR MOTOR VEHICLES WITH A FRONT MOUNTED TRANSVERSE DRIVE UNIT

BACKGROUND OF THE INVENTION

1. TECHNICAL FIELD

The invention relates to a change-speed gearbox for motor vehicles with a front mounted transverse drive unit comprising a change-speed gearbox in line with an engine and a final drive, which is driven by the output gearwheel of the change-speed gearbox and has its main axle mounted in the gearbox housing.

2. DESCRIPTION OF THE PRIOR ART

From German patent 36 21 620, a change-speed gearbox for motor vehicles having a front mounted transverse drive unit is known, wherein the final drive connected to the output gearwheel of the change-speed gearbox is a differential gear unit for driving the front wheels of the vehicle.

In this known change-speed gearbox, a bevel gear right-angle drive is connected to the differential gear unit by way of a hollow shaft, so that a vehicle can be provided with four-wheel drive while retaining a large number of the components. In the case of the known change-speed gearbox, it is further proposed to employ the differential gear unit only as a housing which drives the bevel gear right-angle drive by way of the hollow shaft, in order to provide only a rear-wheel drive for a vehicle.

While the known change-speed gearbox has the advantage that it can be used as part of an assembly kit for vehicles with front-wheel drive, with four-wheel drive, and even with rear-wheel drive, the retention of the differential housing and the hollow shaft nevertheless imposes severe design limitations on the bevel gear right-angle drive. Arranging the bevel gear right-angle drive laterally offset from the output gearwheel brings it into the region of the adjoining clutch and of the engine, and hence, for spatial reasons, the optimum diameter design cannot be accommodated.

SUMMARY OF THE INVENTION

It is an object of the invention to provide a change-speed gearbox with a front mounted transverse drive unit of the kind referred to above which, while retaining the gearbox housing, makes it possible to design the change-speed gearbox for a vehicle with only a rear-wheel drive while maintaining a large degree of freedom for the design of the bevel gear right-angle drive.

With this object in mind, the invention provides a change-speed gearbox for motor vehicles with a front mounted transverse drive unit comprising a change-speed gearbox in line with an engine and a final drive, which is driven by the output gearwheel of the change-speed gearbox and has its main axle mounted in the gearbox housing. The final drive is a bevel gear right-angle drive consisting of a crown wheel and a pinion, the crown wheel being arranged on an axle member consisting of the same material as the gearbox housing, the axle member being arranged in the constructional space provided in the gearbox housing to receive a final differential gear unit for a front-wheel drive vehicle.

Because the final drive is directly a bevel gear right-angle drive consisting of a crown wheel and a pinion and the crown wheel is arranged on an axle member made of the same material as the gearbox housing, the gearbox housing designed for a front-wheel drive vehicle can also be used substantially unchanged for a vehicle with rear-wheel drive, making optimum usage of the constructional space and a low-lying arrangement of the propeller shaft possible, thereby achieving savings in weight and cost.

Other aspects of the invention include advantageous ways of mounting the axle member.

According to one embodiment, the mounting of the axle member consists a roller bearing on one side and a double rolling bearing preloaded by means of an adjusting nut on the other side, the preloaded double rolling bearing being adjustably fitted in the gearbox housing by means of an adjustable bearing sleeve of a kind known per se for the adjustment of the crown wheel-pinion mounting distance by means of a screw thread, being sealed by means of an O-ring and being secured by means of a lock nut.

In another embodiment, the mounting of the axle member consists of two taper roller bearings, preloaded relatively to one another, which are received in bearing sleeves which are screwed into screw threads in the gearbox housing, the bearing sleeves being sealed by means of O-rings and being capable of adjustment by an actuating tooth system for adjustment of the bearing preload and for adjustment of the crown wheel-pinion mounting distance.

Advantageously, the bearing mountings for the axle member are formed in the gearbox housing so that, without any change to the housing, the output gearwheel can be connected to a final differential gear unit from which the axle shafts for the driven front wheels of the vehicle can be directly driven.

BRIEF DESCRIPTION OF THE DRAWINGS

The invention will now be described in more detail, by way of example, with reference to two embodiments shown in the drawings, in which.

DETAILED DESCRIPTION OF PREFERRED EMBODIMENTS

Figure 1:
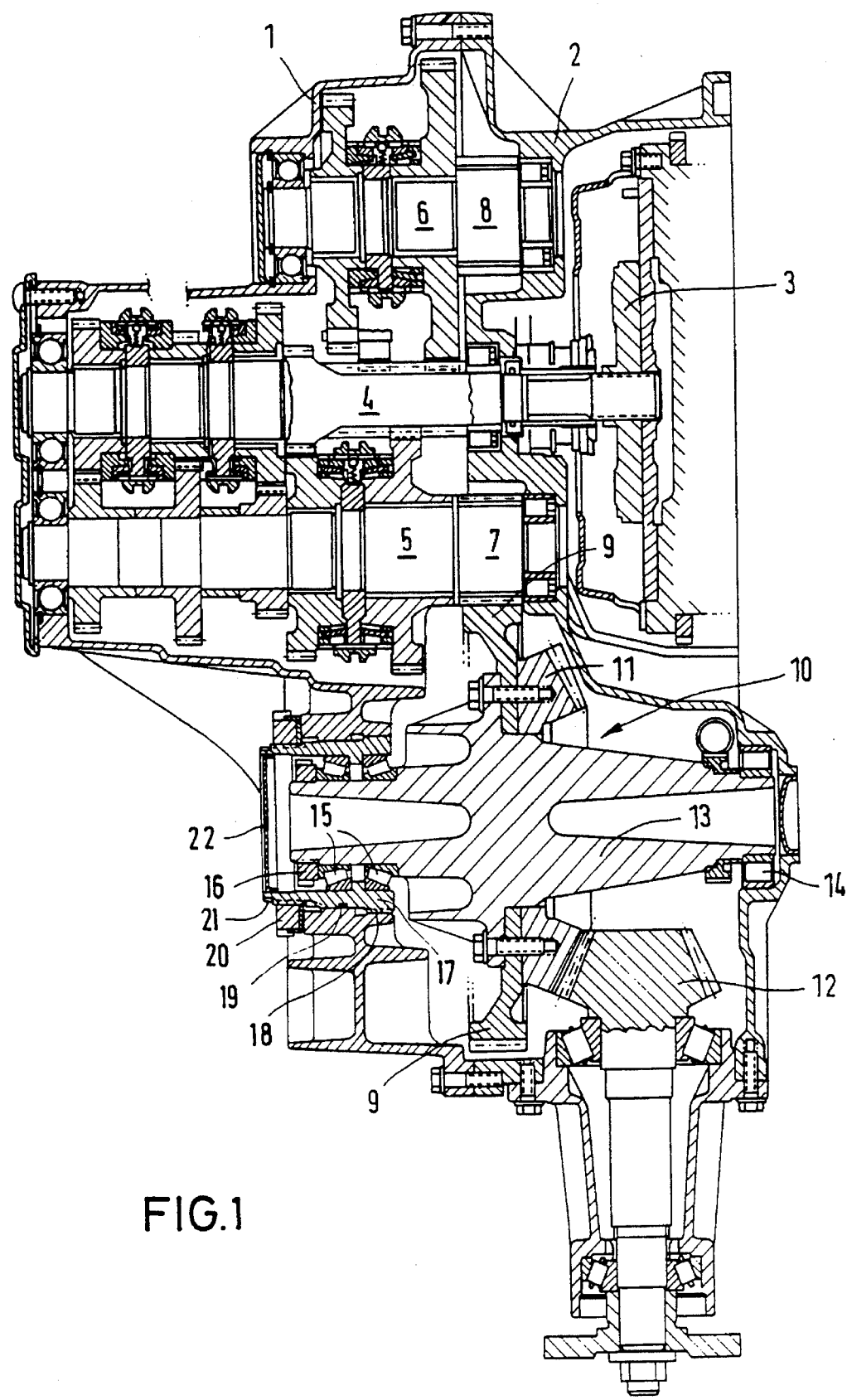
FIG. 1 shows a developed sectional view of a change-speed gearbox in accordance with the invention with one embodiment of the bevel gear right-angle drive.

The change-speed gearbox shown in FIG. 1 consists essentially of a gearbox housing made up of two parts, namely, a gearbox housing 1 and a clutch/gearbox housing 2. Rotatably mounted in the housings 1, 2, are an input shaft 4, connected to the clutch 3 (indicated only in outline), and two countershafts 5 and 6.

The input shaft 4 and the countershafts 5 and 6 carry, in known manner, respectively fixed and loose gearwheels for various gear speeds, the loose gearwheels being capable of being connected nonrotatably to their respective shafts by way of corresponding synchronising devices.

The construction of the present change-speed gearbox is one in which, in known manner, output pinions 7 and 8 transmit torque from both the countershafts 5 and 6 to an output gearwheel 9.

Connected nonrotatably to the output gearwheel 9 is a bevel gear right-angle drive 10, the design of which will now be described.

The bevel gear right-angle drive 10 consists of a crown wheel 11 and a pinion 12, which are in engagement with one another, e.g., through hypoid gearing. However, in accordance with the invention, the crown wheel 11 is carried on an axle member 13, which consists of the same material as the gearbox housings 1, 2, thus avoiding problems caused by differences in thermal expansion between the gearbox housings 1, 2 and the axle member 13.

The axle member 13 is rotatably mounted in the gearbox housings 1, 2 by means of bearing units 14 and 15, the double bearing unit 15 on one side being preloaded by means of an adjusting nut 16 screwed on to the axle member 13. The double bearing unit 15 loaded on the axle member 13 by means of the adjusting nut 16 is accommodated outside in a bearing sleeve 17, which is fitted in the gearbox housing 1 by means of a screw thread 18, is sealed by means of an O-ring 19, and is secured by means of a lock nut 20 with a locking plate. The bearing sleeve 17 is provided at its outer end with an actuating tooth system 21 and is closed off by means of a forced-in cap 22.

In assembling the change-speed gearbox, all the shafts and the components carried on them are preassembled and then fitted in the clutch/gearbox housing 2, as is the axle member 13 with the double bearing unit 15, the adjusting nut 16, and the bearing sleeve 17 preassembled on it. In putting together the gearbox housing 1 and clutch/gearbox housing 2, the bearing sleeve 17 must be rotated by means of the actuating tooth system 21, that is to say, screwed into the screw thread 18, until the flanges of the two parts of the housing meet. Then, after the two parts of the housing have then been connected together, the crown wheelpinion mounting distance is adjusted by further rotation of the bearing sleeve 17.

By this simple method of assembly, measurement of the distance between the bearings and adjustment of the preload of the bearings by selection washers and the like, which has hitherto been necessary in the case of gearbox arrangements of this kind, is avoided. Because the axle member 13 consists of the same material as the gearbox housings 1, 2, a decrease in bearing preload due to thermal expansion is avoided and misalignment of the gear teeth is eliminated. A reduction in the tooth noise in operation can thereby be achieved. A further advantage is that axle member 13, with the toothed parts 11 and 12, and the bearing sleeve 17 arranged on it can be delivered preassembled to the gearbox assembly line.

Figure 2:
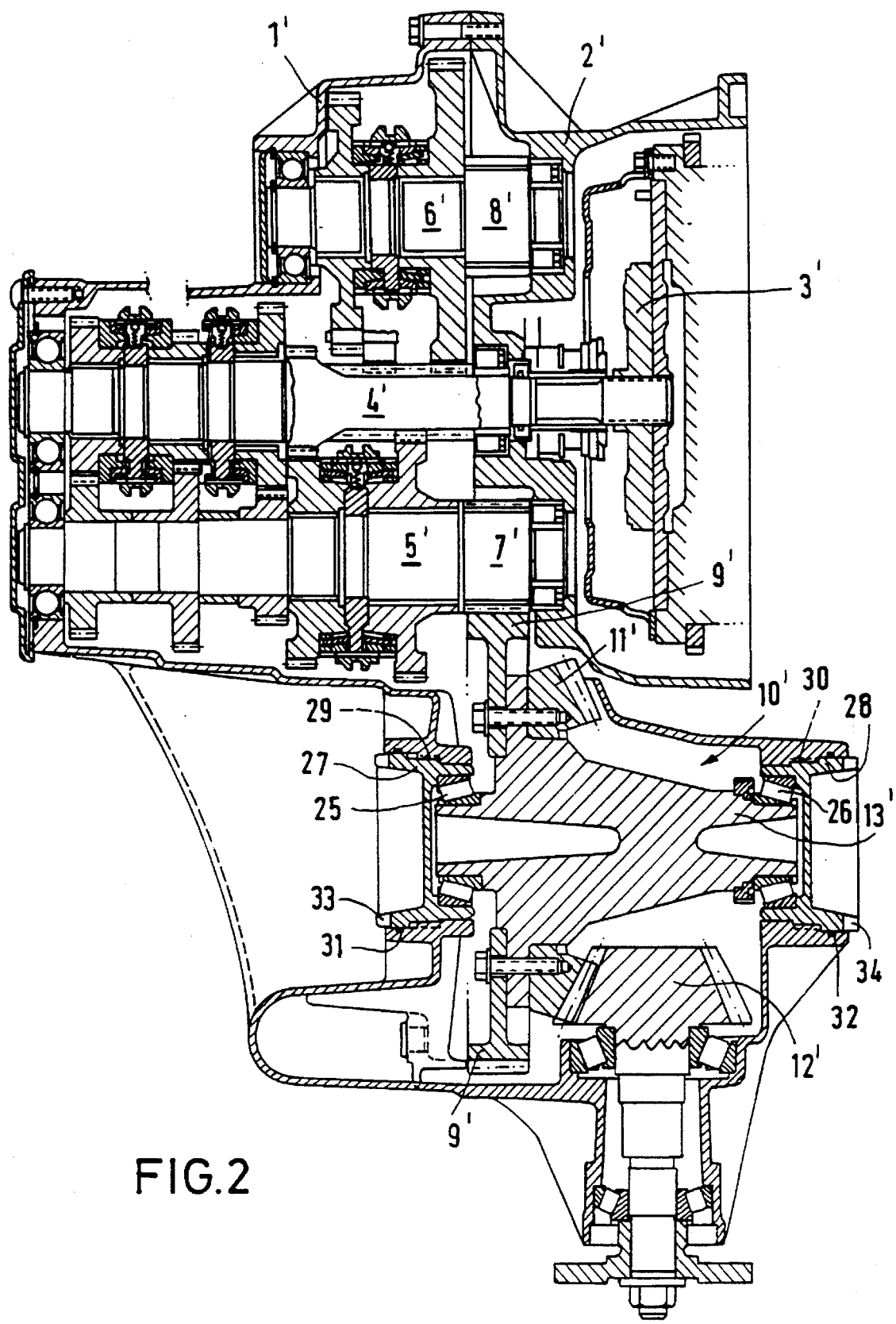
FIG. 2 shows a developed sectional view of a change-speed gearbox in accordance with the invention with another embodiment of the bevel gear right-angle drive.

In the case of the embodiment of the change-speed gearbox of the invention shown in FIG. 2, the general construction of the gearbox corresponds to that described in FIG. 1 and, accordingly, the same reference symbols are used, distinguished only by prime marks.

This embodiment differs in the mounting of the axle member 13', which in this case is carried in conventional manner in two taper roller bearings loaded relative to one another.

The bevel gear right-angle drive 10' again consists of a crown wheel 11' and a pinion 12', which are in engagement with one another, e.g., by way of hypoid gearing. The crown wheel 11' is again arranged on an axle member 13', which consists of the same material as the gearbox housings 1', 2', whereby problems due to differences in thermal expansion between the gearbox housings 1', 2' and the axle member 13' are avoided.

The axle member 13' is rotatably mounted in the gearbox housings 1', 2' by means of taper roller bearings 25 and 26, which are fitted in respective bearing sleeves 27 and 28 which are screwed in by means of screw threads 29 and in the gearbox housing 1 and in the clutch/gearbox housing 2, respectively.

The bearing sleeves 27 and 28 are sealed against the respective housing openings by means of O-rings 31 and 32 located in recesses in the housing opening, and have on their free ends actuating tooth systems 33 and 34, with which the preloading adjustment of the taper roller bearing arrangement can be undertaken.

Of course, once the bearing preload and the crown wheel-pinion mounting distance have been successfully adjusted, the bearing sleeves 27 and 28 can be secured in known manner against unintentional rotation.

The important difference between the two embodiments of the change-speed gear with a bevel gear right-angle drive, in accordance with the invention shown in Figure i and in FIG. 2, consists in that in the case of FIG. 1, the bevel gear right-angle drive can be adjusted from only one side, whereas in the embodiment shown in FIG. 2, both sides of the bevel gear right-angle drive must be accessible in order to make the adjustment.

The gearbox housings 1, 2 or 1', 2' can be so designed in the region in which the respective axle member 13 or 13' is located and mounted that, without any changes in the housing, the respective output gearwheel 9 or 9' can be connected to a final differential gear unit, from which the axle drive shafts for the driven front wheels of the vehicle can be directly driven.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed is:

1. A change-speed gearbox for motor vehicles having a front-mounted transverse drive unit, comprising:

a gearbox housing;

a change-speed gearbox located in the gearbox housing, arranged in line with an engine and having an output gearwheel; and a bevel gear right-angle final drive unit driveably connected to the output gearwheel, including an axle made of the same material as the gearbox housing, a crown wheel supported on the axle and a pinion driveably engaged with the crown wheel, the axle being located in the gearbox housing.

2. A change-speed gearbox according to claim 1, further comprising:

a roller bearing located at a first lateral side of the axle;

a double roller bearing located at a second lateral side of the axle opposite the first lateral side, the axle supported rotatably on the roller bearing and double roller bearing;

an adjusting nut for preloading the double roller bearing;

a bearing sleeve contacting the double roller bearing, having screw threads adapted to engage screw threads located on the gearbox housing for adjustably fitting the preloaded double roller bearing in the gearbox housing;

a seal for sealing a space between the bearing sleeve and the gearbox housing against passage of contaminants; and a lock nut contacting the gearbox housing, having screw threads engaging the bearing sleeve, for securing the double roller bearing.

3. A change-speed gearbox according to claim 1, further comprising:

first and second taper roller bearings spaced mutually along the axle, rotatably supporting the axle, said first and second taper roller bearings being preloaded relatively to one another:

a first bearing sleeve contacting the first roller bearing, having screw threads engaging screw threads in the gearbox housing, and actuating teeth for rotating the first bearing sleeve relative to the gearbox housing, thereby adjusting a preload of the first bearing;

a second bearing sleeve contacting the second roller bearing, having screw threads engaging screw threads in the gearbox housing, and actuating teeth for rotating the second bearing sleeve relative to the gearbox housing, thereby adjusting a preload of the second bearing; and seals for sealing a space between the bearing sleeves and gearbox housing against passage of contaminants.

* * * * *